Oct. 4, 1938.  J. B. GRIFFIN  2,131,874
RADIATOR PROTECTOR
Filed May 25, 1936  2 Sheets-Sheet 1

Inventor
JOHN B. GRIFFIN
By N. Clay Lindsey
Attorney

Oct. 4, 1938.   J. B. GRIFFIN   2,131,874
RADIATOR PROTECTOR
Filed May 25, 1936   2 Sheets-Sheet 2
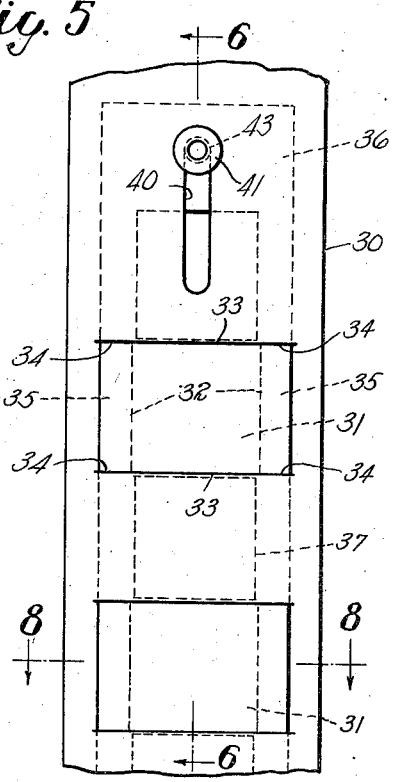
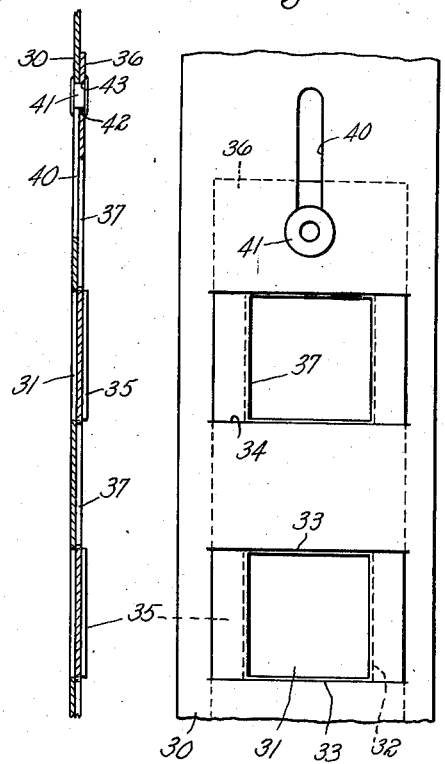
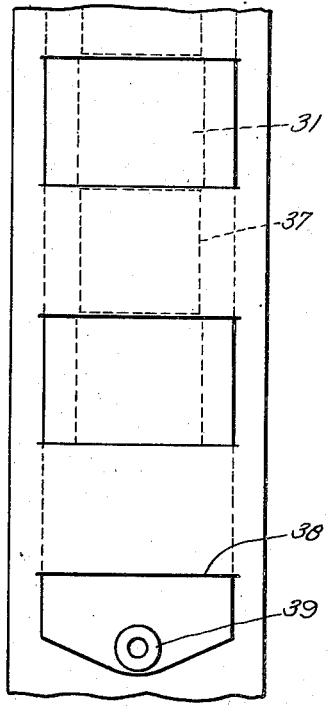
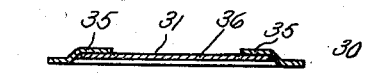
Inventor
JOHN B. GRIFFIN
By R. Clay Lindsey
Attorney Patented Oct. 4, 1938

2,131,874

UNITED STATES PATENT OFFICE 2,131,874

RADIATOR PROTECTOR

John B. Griffin, Oakville, Conn.

Application May 25, 1936, Serial No. 81,560

5 Claims. (Cl. 257—132)

This invention relates to a protector for an automobile radiator, and, more particularly, to a cover composed of a plurality of cooperating baffles whereby the extent of air flow through said radiator may be retarded to a desired extent to maintain a suitable motor operating temperature.

Heretofore, various devices have been employed for covering and protecting the front of an automobile radiator so that the cooling air flow therethrough could be limited during cold weather. These various devices have usually composed a blanket-like member adapted to be removably secured to the grill in front of a radiator and having a closed and partly open position. However, these prior types of radiator protectors are inconvenient to use, difficult to apply, and do not usually baffle the required amount of a radiator to regulate a desired air flow therethrough. Furthermore, many automobile drivers have refrained from using these prior types of covers due to their unsightly appearance.

It is therefore the aim of the present invention to provide a simple baffle device which may be quickly and easily applied and removed from the front portion of an automobile radiator and which is adjustable to such extent as to be highly effective in operation and which will also enhance the appearance of the front portion of an automobile.

It is a further object of my invention to provide a plurality of baffles adapted to be resiliently and removably secured in cooperative covering engagement over a front portion of an automobile radiator to regulate the air flow through said radiator to any desired extent.

Other objects will be apparent from the ensuing disclosure of my invention.

Referring to the drawings wherein I have indicated like parts by like numerals:

Fig. 5 shows a different embodiment of my invention wherein a baffle includes a shutter portion herein illustrated in closed position;

Fig. 6 shows a longitudinal section taken substantially along line 6—6 of Fig. 5;

Fig. 7 shows the shutter in open position; and

Fig. 8 is a transverse section taken along line 8—8 of Fig. 5.

Figure 1:
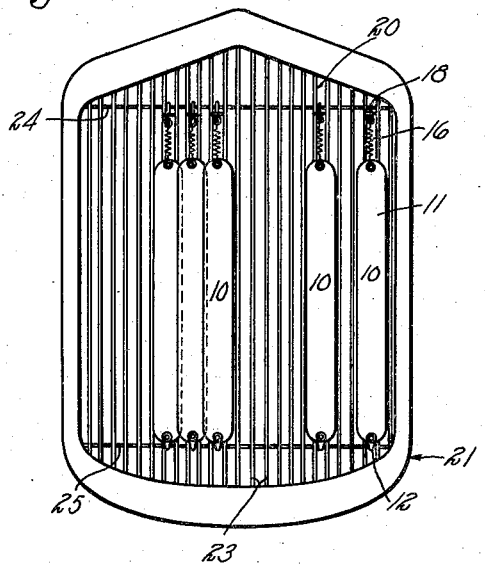
Figure 1 shows a plurality of my devices applied in cooperative and in individual relation to the front portion of an automobile radiator grill to control the flow of air therethrough.
Figure 2:
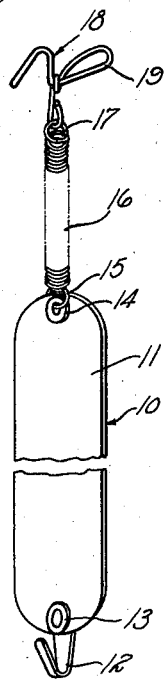
Fig. 2 is a perspective view of my invention.

Referring to the drawings with reference to the embodiment of my invention disclosed in Figs. 1 and 2, I have provided a baffle member, generally indicated at 10, which, in the present instance, includes a flexible strip 11 having a locating hook 12 secured to its lower end as by an eyelet 13 or other suitable means. The upper end of strip 11 is apertured to receive a reinforcing eyelet 14 whereby the lower hooked end 15 of a coiled spring 16 may be pivotally retained therein. The upper end of spring 16 terminates in a loop 17 pivotally engaged by a hook 18 having a suitable handle 19 formed thereon.

The baffle members 10 are adapted to be detachably and resiliently secured to the grill 20 of an automobile radiator, generally indicated at 21. In accordance with the general construction of many of the present day vehicle radiators, 20 the grill 20 which forms a decorative and protecting front portion of radiator 21 is provided with a plurality of spaced vertically extending bars 23 braced by cross members 24 and 25. Hooks 12 may be located between adjacent bars 23 and engaged under bar 25 as shown, and hooks 18 may be similarly engaged over bar 24. It will be appreciated, of course, that the length of strips 11 is so chosen that springs 16 are in resiliently stretched positions when the hooks engage the respective bars 24 and 25, thereby maintaining baffle strips 11 against the front of grill 20. In the event that the cross bars 24 and 25 are not conveniently located for application of my baffle members 10, it is to be understood that any suitable type of cross bar may easily be removably clamped either in front or behind the vertical bars 23 so that members 10 may be removably located in desired positions.

As shown in Fig. 1, it will be appreciated that members 10 may be located in overlapping relation to completely baffle an entire section of a radiator or in individual spaced relation to regulate the flow of air therethrough. Hence, by engaging the respective hooks 12 and 18 with cross members 24 and 25, one or more baffles may be quickly and easily located in desired positions. I preferably provide the hooks 12 and 18 and spring 16, as well as eyelets 13 and 14, with the same finish as produced on the radiator grill 20 so that said members will not be particularly noticeable, but will tend to enhance the appearance of the front of a vehicle when mounted in position. The strip 11 may be made of any suitable flexible material, and I preferably compose said strip of a transparent material such as Celluloid or Cellophane and round the ends thereof to prevent tendency of tearing and to also provide a neat appearance. Hence, it will be apparent that when strips 11 are composed of a transparent material, my radiator cover will not noticeably change the general appearance of the front of a motor car.

Figures 3, 4:
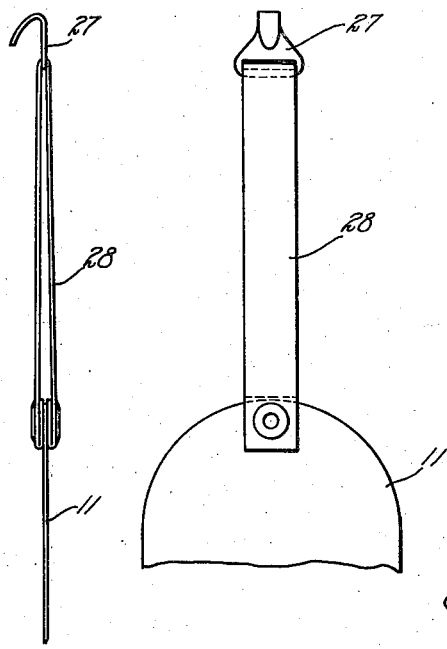
Fig. 3 shows a side elevation of a slightly different embodiment of my invention.
Fig. 4 shows a plan view of the parts illustrated in Fig. 3.

In Figs. 3 and 4, I have shown a slightly different embodiment of my invention wherein the upper end of strip 11 has a hook 27 resiliently secured thereto by an intervening strip of suitable resilient material, such as a flat strip of elastic webbing 28, which will normally lie under resilient tension when hook 27 is in operative engagement with rod 24. It will be appreciated, of course, that this modified construction may be employed in the same manner as heretofore disclosed with relation to the embodiment shown in Figs. 1 and 2.

In Figs. 5 to 8, I have illustrated another embodiment of my invention wherein one or more of the baffles may include a shutter portion adapted to regulate the flow of air through a series of spaced apertures so that a very exact adjustment of baffling may be provided. As therein shown, I provide a baffle strip 30 corresponding in general outer contour to my strip 11 and arranged to be resiliently but removably secured to the radiator grill in any desired position and in the manner previously described. Strip 30 is provided with a series of spaced aligned apertures 31 illustrated herein as substantially rectangular in form and defined by the respectively spaced longitudinal edges 32 and transverse edges 33. It will be evident, however, that these apertures may be of any suitable size and contour. In forming these apertures in strip 30, the transverse edges 33 extend a short distance beyond the longitudinal edges 32, thus providing opposed slotted portions 34 at the top and bottom of each aperture and extending laterally therefrom to form spaced longitudinally extending guiding lips 35 at each side of apertures 31.

A shutter member 36 extends longitudinally of strip 30 and is provided with a series of spaced apertures 37 of similar contour and in similar spaced relation to apertures 31 so that member 36 may be slidably and adjustably positioned relative to strip 30 and regulate the opening of the apertures to any desired extent. Figs. 5 and 7 respectively illustrate the shutter in closed and open positions. Shutter 36 passes through slots 34 and frictionally engages lips 35 springing the lips out of the plane of strip 30 so that the shutter will be free for slidable adjustment. To suitably secure the bottom of shutter 36 in engagement with strip 30, I further provide a transversely extending spaced slot 38 of slightly greater extent than the width of member 36 so that the shutter may slidably pass therethrough. The bottom of the shutter may be provided with an eyelet 39, or other suitable member, serving as a handle and normally preventing the shutter from being pulled out of registering engagement with slot 38. The top of strip 30 adjacent the movable end of shutter 36 is provided with a longitudinally extending slot 40. A tubular rivet or eyelet 41 forming an operating handle has a shank portion 42 received within an aperture 43 in the top of shutter 36 and slidably mounted in slot 40. The shank terminates at both ends in flanged heads respectively and frictionally engaging members 30 and 36 to aid in securing the shutter member in adjusted position. It will thus be evident that a downward pull on eyelet 39 longitudinally of strip 30 will serve to open apertures 31, and an upward pull on eyelet 41 will serve to close the shutter to the desired extent. The slot 40 limits the maximum movement of the shutter in open and closed positions, and the frictional engagement of the parts maintains the shutter in any readjusted position. Hence, the shutter may be easily and quickly adjusted when the baffle is located on a radiator grill. My baffle and shutter may be composed of any suitable flexible material and preferably are made from a slightly rigid transparent material such as Celluloid or Cellophane.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A protective cover for an automobile radiator comprising an elongated flexible strip, a fastening device secured to one end of said strip, a resilient member secured at one end to the opposite end of said strip and at its other end to a second fastening device, said fastening devices being adapted to selectively and removably engage the front portion of an automobile radiator whereby the flexible strip may be located in a desired position.

2. A protective cover for an automobile radiator comprising an elongated flexible strip, a hook secured to the lower end of said strip, an elongated resilient member secured at its lower end to the upper end of said strip, and a second hook secured to the upper end of the resilient member, said hooks being adapted to selectively engage various portions of an automobile radiator and maintain the flexible strip in desired position under influence of the resilient member.

3. A protective cover for an automobile radiator comprising a plurality of transparent flexible strips in adjacent cooperative relation, a hook secured to the lower end of each strip and adapted to removably interlock with the lower front portion of the radiator, an eyelet at the upper end of each strip, a plurality of elongated resilient members, each being respectively secured at one end to an eyelet, and a hook secured to the upper end of each of said resilient members and adapted to tension said members and interlock with an upper radiator portion whereby the strips may be positioned as desired to regulate the air flow through a radiator as desired.

4. In a radiator cover, an elongated transparent flexible strip having a plurality of substantially rectangular spaced apertures therethrough and longitudinally thereof, the top of each aperture terminating in a transverse slot, an elongated flexible transparent slide member passing through said slots for slidable movement relative to the flexible strip and having apertures similar in position and shape to said first mentioned apertures, and means limiting the extent of slidable movement of the slide member whereby said sets of apertures may be located in desired registering positions to control the effective air flow through the apertures in the flexible strip.

5. In a radiator cover, an elongated flexible strip, a fastening device secured to one end of the strip, a resilient member secured at one end to the opposite end of the strip and at its other end to a second fastening device, said fastening devices being selectively engageable with the front portion of an automobile radiator, the strip being provided with a series of spaced apertures therethrough, and a shutter member slidably supported by said strip for movement in alignment therewith and having spaced apertures therethrough arranged to be moved into and out of alignment with said other apertures whereby the effective size of the apertures through the strip may be controlled to regulate the air flow to the radiator.

JOHN B. GRIFFIN.